J. F. O'CONNOR.
CAR CONSTRUCTION.
APPLICATION FILED APR. 14, 1916.
1,290,305.
Patented Jan. 7, 1919.
2 SHEETS—SHEET 2.
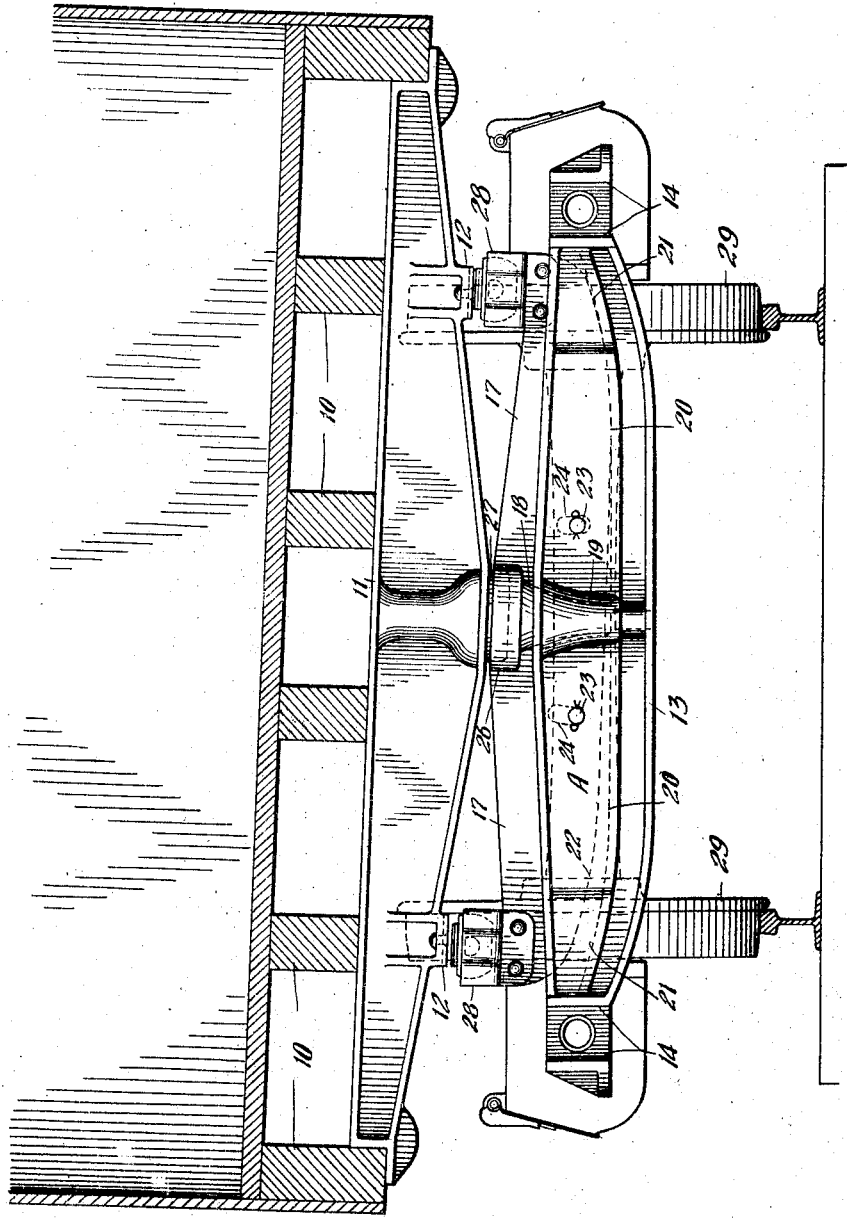
WITNESSES:
Wm. Geiger
INVENTOR.
John F. O'Connor
BY George J. Haight
ATTORNEY

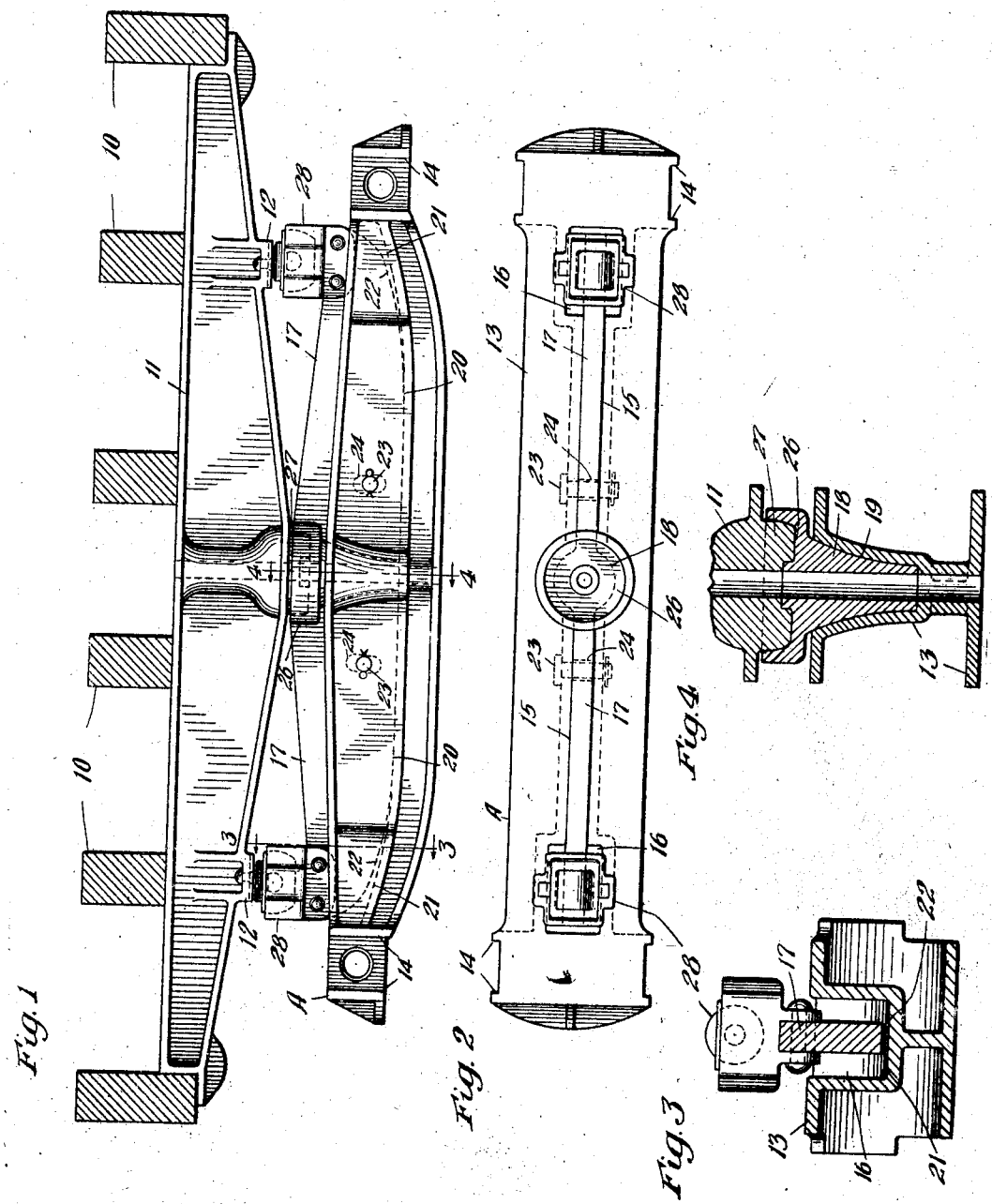

UNITED STATES PATENT OFFICE.

JOHN F. O'CONNOR, OF CHICAGO, ILLINOIS, ASSIGNOR TO WILLIAM H. MINER, OF CHAZY, NEW YORK.

CAR CONSTRUCTION.

1,290,305.  Specification of Letters Patent.  Patented Jan. 7, 1919.

Application filed April 14, 1916. Serial No. 91,207.

*To all whom it may concern:*

Be it known that I, JOHN F. O'CONNOR, a citizen of the United States, residing at Chicago, in the county of Cook and State of Illinois, have invented a certain new and useful Improvement in Car Constructions, of which the following is a full, clear, concise, and exact description, reference being had to the accompanying drawings, forming a part of this specification.

This invention relates to improvements in car construction.

The object of the invention is to provide an improved car construction, and more particularly an improved truck bolster, so arranged as to prevent the transfer of the entire weight of one end of a car to a single side bearing.

Another object of the invention is to provide an improved form of truck bolster so arranged as to minimize the tendency of the truck and body bolsters to separate at the center plate when a car is passing over a banked curved track.

A still further and more general object of the invention is to provide improved car construction which will contribute generally to the safety in operation of cars.

In the drawing forming a part of this specification, Figure 1 is a transverse, vertical sectional view of a portion of a car at one side of the bolsters. Fig. 2 is a top plan view of my improved truck bolster. Figs. 3 and 4 are detailed sectional views taken on the lines 3—3 and 4—4 respectively, of Fig. 1. And Fig. 5 is a view similar to Fig. 1 which illustrates the operation of the construction while the car is passing over a curved track.

In the operation of railroad cars, and more particularly refrigerator cars which are extremely rigid, there is a constant tendency for the weight of the car at one end to be transferred entirely to the outer side bearing when the car passes over a curved track of a short radius and when the outer rail is elevated more than customary. The effect of the condition above mentioned, is to separate the body and truck bolsters at the center bearing inasmuch as there is no load at that point. This, of course, causes derailment and dangerous accidents. With my improved arrangement, part of the load is always carried by the center bearing between the bolsters and when the load on the outside bearing, as the car passes over a curved track, reaches a predetermined percentage of the total weight borne by a truck, an equalizer bar is brought into play by which a part of the load is maintained at the center bearing and the two bolsters prevented from separation. Under all normal conditions, the usual clearance between the side bearing members of the bolsters will be maintained.

Referring now to said drawing, 10—10 denote longitudinal sills of a freight car, 11 a body bolster having side bearing members 12—12, and A the improved truck bolster, said bolsters being united by a center pin.

The improved truck bolster A comprises a bolster casting proper 13 having the usual guides 14 at the ends to coöperate with the column guides of the truck, and a deep groove or recess 15 extending lengthwise of the casting 13, said recess 15 being enlarged at the ends thereof as indicated at 16. Movably mounted within said recess 15, is an equalizer bar 17 of substantially rectangular cross-section, said bar 17 having a central enlargement 18 which fits within a corresponding recess 19 formed in the casting 13. The bottom of the recess 15 is preferably flat between points 20—20 and the bottom edge of the bar 17 is also preferably flat. The recess 15 at each end beyond the points 20 is curved upwardly as indicated at 21—21 and the lower edge of the bar 17, outside of said points 20, is also curved upwardly as indicated at 22—22, the upward curve of the portions 22 of the bar being greater than the upward curvature of the portions 21 of the recess so as to thereby provide clearance as is apparent from an inspection of Figs. 1 and 5. The hub 18 of the bar 17 and the side walls of the recess 19 within which said hub is received, are struck on radii the centers of which coincide with said points 20 on each side of the center pin, thereby permitting the equalizer bar to pivot or rock relatively to the casting 13 about either point 20 as a center. In order to prevent accidental separation of the bar 17 and casting 13, and also to limit the possible relative movement therebetween, I have provided pins 23 seated in the walls of the casting 13, said pins passing through vertically elongated slots 24 in the equalizer bar, as appears from Figs. 1 and 5. The bar 17 carries a truck center plate portion 26 which coöperates with a body bolster center plate section 27, as shown in Fig. 4 to thereby permit the relative turning movements between the bolsters. At each end, the bar 17 is provided with a roller side bearing 28 which is arranged to coöperate with the bearing portion 12 of the body bolster. It will be obvious that any suitable form of side bearing may be employed.

By referring now to Fig. 5, it will be seen that, when the wheels 29 of the truck strike a curved portion of the track, the outer wheel will ride up the raised outer track, thereby tilting the truck as will be understood. The tendency of the car body, when the advance truck strikes the curved portion of the track is to remain horizontal with the result that excessive pressure is transferred to the outer side bearing 28. The points 20, heretofore referred to, are so designed that, when a pre-determined portion of the weight of one end of the car is transferred to the outer side bearing 28 (in this instance, preferably 60 per cent. of the weight), the equalizer bar 17 will be tilted about the point 20 to the position illustrated in Fig. 5. It is apparent that a portion of the load is still maintained at the center bearings between the bolsters so that the two bolsters will not separate and transference of the entire weight of the end of the car to the outer side bearing 28 is prevented. In all normal operations of the car, the equalizer bar 17 will rest upon its flat lower edge and rocking will not occur, thus maintaining the usual clearance between the side bearing members under normal conditions.

Although I have herein shown and described what I now consider the preferred embodiment of my invention, the same is merely illustrative and I contemplate all changes and modifications that come within the scope of claims appended hereto.

I claim:

1. In car construction, the combination with a body bolster having side bearing members, of a truck bolster, the latter having an equalizer bar also carrying side bearing members coöperable with said side bearing members on the body bolster, said bar being pivotally mounted relatively to the truck bolster.

2. A truck bolster for cars having a single piece equalizer bar mounted thereon and adapted to move relatively thereto in a vertical plane, said bar extending substantially from one end to the other end of the bolster.

3. A truck bolster having an equalizer bar rockably mounted thereon, said bar being adapted to carry side bearing members and being provided with a lower center plate.

4. In car construction, the combination with a body bolster of a truck bolster, the latter comprising two members relatively movable in a vertical plane.

5. A truck bolster for railway cars comprising a casting and an equalizer bar rockably mounted thereon, said bar being arranged to coöperate with the center bearing member of a body bolster and adapted to have side bearing members applied thereto at its ends.

6. A bolster for railway cars comprising, a casting having a slot extending longitudinally thereof, and a single equalizer bar mounted within said slot to rock within a vertical plane, said equalizer bar having its ends extended to points adjacent the ends of said casting.

7. A truck bolster for railway cars comprising a casting having a slot extending longitudinally thereof and an equalizer bar mounted within said slot and arranged to rock with respect to said casting in a vertical plane and adapted to engage at its center with a body bolster.

8. In car construction, the combination with a body bolster and a truck bolster comprising, a main casting, and a single equalizer bar interposed between said casting and the body bolster, said bar being movable in a vertical plane relatively to said casting and having its center coinciding with the center of the bolster.

9. In car construction, the combination with a body bolster, of a truck bolster comprising a casting and an equalizer bar, said casting having a slot extending lengthwise thereof within which said bar is mounted, said bar and body bolster being swivelly mounted, said equalizer bar and body bolster being also provided with coöperating side bearing members.

10. In car construction, a truck bolster comprising a casting having a recess in its upper face extending lengthwise thereof, and an equalizer bar rockably mounted within said recess, said bar being rockable with respect to said casting about points on either side of the center of the bolster.

11. In car construction, a truck bolster comprising a casting and an equalizer bar, said equalizer bar being mounted within a recess extending lengthwise of said casting in its upper face, said bar being rockable relatively to said casting about pivot points on either side of the center of the bolster, said bar being arranged to carry a lower center plate and side bearing members.

In witness that I claim the foregoing I have hereunto subscribed my name this 28th day of March 1916.

JOHN F. O'CONNOR.